United States Patent Office 3,415,936
Patented Dec. 10, 1968

3,415,936
BACTERICIDE FOR BRINE INJECTION
Donald O. Hitzman, Bartlesville, Okla., assignor to Phillips Petroleum Company, a corporation of Delaware
No Drawing. Filed Nov. 26, 1963, Ser. No. 326,201
3 Claims. (Cl. 424—319)

ABSTRACT OF THE DISCLOSURE

A bactericidal composition comprising a mixture of a halonitroalkanol and a composition selected from the group consisting of water dispersible and water soluble alkylphenoxypoly(ethyleneoxy)ethanols, alkyl quaternary ammonium salts, N-alkylated β-aminopropionic acid, and salts of said acid, polyphenols, aliphatic polyphenols, salts of said phenols, and halogenated derivatives of said phenols and salts, aliphatic amines, and salts of aliphatic amines.

---

This invention relates to bactericides. In one aspect, it relates to control of bacteria in water. In another aspect, it relates to bactericidal compositions which are effective when added to water. In another aspect, it relates to water containing bactericidal compositions. In another aspect, it relates to the disposal of water by injection into underground formations and to the use of water in oil field water flooding operations.

Bactericides for use in water, to produce water in which bacteria, microbes, fungi, yeasts, and other microorganisms will not multiply, are useful in many commercial applications. They are especially useful in producing oil and gas from underground formations by water displacement. In such operations, it is difficult to maintain the process if sulfate reducing bacteria or other anaerobic or facultative bacteria are present in the water.

In many instances, the success or failure of a water flood of an underground petroleum bearing formation or a disposal of brine produced from oil wells, depends upon the ability of the operator to control the growth of sulfate reducing bacteria in the injected water. Such microorganisms cause corrosion of the well pipe by accelerating galvanic corrosion, and reduce sulfates to sulfides which react with soluble iron salt to form insoluble iron sulfide causing severe plugging of the formation into which the water is being injected.

Another object of my invention is to provide an additive for water to kill, reduce the number of and inhibit the growth of bacteria in water.

Another object is to provide an aqueous liquid composition resistant to bacteria, comprising water and an additive.

Another object is to provide an improved process of injecting water into an underground formation either for disposal of the water or a formation water flooding operation.

Other aspects, objects, and the advantages of my invention are apparent in the written description, the drawing and the claims.

According to my invention, there is provided a bactericidal composition comprising a mixture comprising from 2.5 to 97.5 weight percent of a halonitroalkanol and from 2.5 to 97.5 weight percent of a composition selected from the group consisting of water dispersible and water soluble alkylphenoxypoly(ethyleneoxy)ethanols, alkyl quaternary ammonium salts, N-alkylated β-aminopropionic acid, and salts of said acid, polyphenols, aliphatic polyphenols, salts of said phenols, and halogenated derivatives of said phenols and salts, aliphatic amines, and salts of aliphatic amines. The halonitroalkanols have the structural formula

wherein R and R' are selected from the group consisting of hydrogen, methyl, ethyl, propyl, hydroxymethyl, hydroxyethyl, hydroxypropyl, hydroxybutyl, and hydroxypentyl; wherein R and R' together contain at least one hydroxyl group; wherein when R and R' both contain hydroxyl groups, R and R' are identical; and wherein X is selected from the group consisting of chloro and bromo.

Further, according to my invention, there is provided a bactericidal liquid resistant to the formation of colonies of bacteria comprising a major amount of water and 2.5 to 97.5 parts of a halonitroalkanol and 2.5 to 97.5 parts of a composition selected from the group consisting of water dispersible and water soluble alkylphenoxypoly(ethyleneoxy)ethanols, alkyl quaternary ammonium salts, N-alkylated β-aminopropionic acid, and salts of said acid, polyphenols, aliphatic polyphenols, salts of said phenols, and halogenated derivatives of said phenols and salts, aliphatic amines, and salts of aliphatic amines, the total amount of said halonitroalkanol and said composition being in the range of 10 to 100 parts per million of the volume of said water.

Further, according to my invention, there is provided a process for treating a well comprising pumping into said well into a permeable earth formation the above bactericidal liquids.

The lower limits of the amount of the bactericidal compounds in the water are effective in the practice of the invention when the bacterial count in the water to be treated is quite low, whereas the upper limit is set by economic considerations and the difficulty with which bacterial colonies within the water are avoided.

The alkylphenoxypoly(ethyleneoxy)ethanols include, for example, various of the compounds manufactured by Rohm & Haas Company and sold under the trade name "Triton," and compounds manufactured by Antara Chemicals Division of General Aniline & Film Corporation and sold under the trade name "Igepal." A typical structural formula of these compounds is

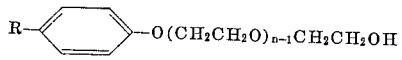

wherein R is an alkyl group, preferably one having 8 to 12 carbon atoms, for example octyl, isooctyl, nonyl, decyl and dodecyl, and n is 4 to 100, preferably 6 to 50. A preferred compound is Triton X–100 wherein R is octyl and n is 9–10.

Specific examples of the N-alkylated β-aminopropionic acids and salts thereof, include the compounds of General Mills sold under the trade name Deriphat, for example Deriphat 160C, a partial sodium salt of N-lauryl β-iminopropionic acid, Deriphat 160, disodium N-lauryl β-iminodipropionate, Deriphat 154, disodium N-tallow β-iminopropionate, Deriphat 151, sodium N-coco β-aminopropionate, and Deriphat 151C, N-coco β-aminopropionic acid. A preferred compound is Deriphat 170C, N-lauryl-myristyl β-aminopropionic acid.

Specific examples of polyphenols useful in the invention of the preceding paragraph are bis phenol, tris phenol and chlorinated or other halogenated bis phenols and tris phenols such as 2,2′-methylene bis-4-chlorophenol, sodium pentachlorophenate and 2,2′-methylene bis-4-bromophenol. A polyphenol salt containing compound useful in said invention is "ET-5," a bactericide made by Dow Chemical Company, which is a liquid containing approximately 55 percent sodium salts of the reaction products between formaldehyde and monochlorinated phenols, therefore consisting essentially of and having as its principal active ingredient said 2,2′-methylene bis-4-chlorophenol. Another polyphenol salt containing compound useful in this invention is "Dowicide F," a bactericide made by the same company, as a 34 percent solution of sodium pentachlorophenate in ethylene glycol having the former as the active ingredient. Bis phenol and tris phenol are obtainable from the General Aniline & Film Company.

salt" covers both alkyl and dialkyl salts and mixtures of the same, as most "Aquads" are mixtures. The alkyl radical may be paraffinic, olefinic, diolefinic, acetylenic, or otherwise unsaturated.

For example, dioctyl dimethylammonium chloride, di-dodecyl dimethylammonium chloride, dodecyl trimethylammonium chloride, dihexadecyl dimethylammonium chloride, hexadecyl trimethylammonium chloride, dioctadecyl dimethylammonium chloride, octadecyl trimethylammonium chloride, dioctadecenyl dimethylammonium chloride, dioctadecadienyl dimethylammonium chloride, hexadecyl octadecyl dimethylammonium chloride, octadecynyl trimethylammonium bromide, hexadecynyl trimethylammonium iodide, and octyl trimethylammonium fluoride, and mixtures of the same are all useful in this invention. Other water dispersible salts, such as the acetates, sulfates, nitrates, and phosphates, are effective in place of the chlorides, but the chlorides are preferred.

A mixture of 1 part tallow trimethylammonium chloride and 1 part di-coconut dimethyl ammonium chloride in a 50 percent solution in propanol, known as "Arquad T–2C," is very effective in the invention.

"Arquads 10, 16, C, S, 2C, 2HT, 2S, S2C and T2C" are effective in the invention and are preferred.

TABLE I

| "R" Groups | Carbon chain length | Arquad 12, percent | Arquad 16, percent | Arquad 18, percent | Arquad C, percent | Arquad S, percent | Arquad 2c, percent | Arquad 2HT, percent |
|---|---|---|---|---|---|---|---|---|
| Octyl | 8 | | | | 8 | | 8 | |
| Decyl | 10 | | | | 9 | | 9 | |
| Dodecyl | 12 | 90 | | | 47 | | 47 | |
| Tetradecyl | 14 | 9 | | | 18 | | 18 | |
| Hexadecyl | 16 | | 90 | 6 | 8 | 10 | 8 | 30 |
| Octadecyl | 18 | | 6 | 93 | 5 | 10 | 10 | 70 |
| Octadecenyl | 18 | 1 | 4 | 1 | 5 | 35 | | |
| Octadecadienyl | 18 | | | | | 45 | | |
| Active ingredient | | 50 | 50 | 50 | 50 | 50 | 75 | 75 |
| NaCl (approximately) | | 1 | 1 | 1 | 1 | 1 | 1 | 1 |
| Isopropanol (approximately) | | 49 | 49 | 49 | 49 | 49 | 24 | 24 |
| Form at room temperature | | (¹) | (²) | (²) | (²) | (²) | (¹) | (³) |

¹ Liquid.
² Semi-liquid.
³ Soft.

NOTE.—"Arquads 2C and 2HT" are dialkyl dimethylammonium chloride. All others are alkyl trimethyl ammonium chlorides.

The other alkali metal salts, ammonium salts, and other water dispersible salts, such as acetates, sulfates, nitrates and phosphates are effective in this invention.

Specific examples of alkyl quaternary ammonium salts useful in said invention are "Arquads" made by Armour & Company, which are alkyl and dialkyl quaternary, ammonium salts, having respectively the general formulas as follows:

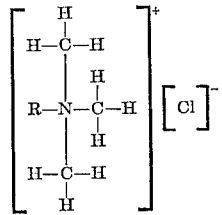

Alkyl trimethylammonium chloride

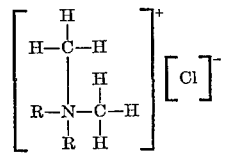

Dialkyl dimethylammonium chloride

Of these alkyl quaternary ammonium salts, those having from 5 to 20 carbon atoms in the alkyl group, or in each alkyl group, as the case may be, are especially effective in this invention. The term "alkyl quarternary ammonium The term aliphatic amines includes primary, secondary, and tertiary amines having alkyl, alkenyl or alkadienyl substituents, alkylene diamines, and alkyl-substituted alkylene diamines, wherein each alkyl, alkenyl, alkadienyl, and alkylene group has 5 to 20 carbon atoms.

Specific examples of aliphatic amines effective in this invention include, for example, octyl amine, decyl amine, dodecyl amine, tetradecyl amine, hexadecyl amine, octadecyl amine, octadecenyl amine, octadecadienyl amine, octadecenyl amine hydrochloride, dodecyl amine hydrobromide, dodecyl amine phosphate, as well as mixtures of the same, and aliphatic diamines and their water-dispersible salts, such as the acetates, sulfates, nitrates, phosphates, hydrochlorides, hydrobromides, hydroiodides and hydrofluorides, but the acetates and chlorides are preferred.

As examples of aliphatic amines, the "Armacs" made by Armour Chemical Division, which are effective in this invention, are acetate salts of aliphatic amines and may be represented as follows:

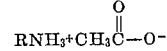

Preferably R represents an alkyl group ranging in length from 5 to 20 carbon atoms, and may be paraffinic, olefinic, diolefinic, acetylenic, or otherwise unsaturated. "Armac C, 14, 16 and 18" are effective in this invention and are preferred. Decyl amine acetate, dodecyl amine acetate, tetradecyl amine acetate, hexadecyl amine acetate, octadecyl amine acetate, octadecenyl amine acetate, and octadecadienyl amine acetate, are effective in this invention, as are mixtures of the same.

The "Armacs" are generally mixtures of aliphatic amines as follows:

As a specific example of a water dispersible salt of an alkylene diamine effective in this invention, "Duomeen

TABLE II

| | Hexyl, 6 | Octyl, 8 | Decyl, 10 | Dodecyl, 12 | Tetradecyl, 14 | Hexadecyl, 16 | Octadecyl 18, unsaturated | Octadecenyl 18, monounsaturated | Octadecadienyl 18, polyunsaturated |
|---|---|---|---|---|---|---|---|---|---|
| Armac 8 | 3 | 90 | 7 | | | | | | |
| Armac 8D | 3 | 90 | 7 | | | | | | |
| Armac 10 | | 4 | 90 | 6 | | | | | |
| Armac 10D | | 4 | 90 | 6 | | | | | |
| Armac 12D | | | 2 | 95 | 3 | | | | |
| Armac 14 | | | | 4 | 92 | 4 | | | |
| Armac 14D | | | | 4 | 92 | 4 | | | |
| Armac 16D | | | | | | 92 | 7 | 1 | |
| Armac 18 | | | | | | 7 | 90 | 3 | |
| Armac 18D | | | | | | 7 | 90 | 3 | |
| Armac HT | | | | | | 25 | 72 | 3 | |
| Armac HTD | | | | | | 25 | 72 | 3 | |
| Armac C | | 8 | 9 | 47 | 18 | 8 | 5 | 5 | |
| Armac CD | | 8 | 9 | 47 | 18 | 8 | 5 | 5 | |
| Armac T | | | | 1 | | 28 | 25 | 46 | |
| Armac TD | | | | 1 | | 28 | 25 | 46 | |
| Armac S | | | | | | 20 | 17 | 26 | 37 |
| Armac SD | | | | | | 20 | 17 | 26 | 37 |

As examples of aliphatic diamines, the "Duomeens" made by Armour Chemical Division, which are effective in this invention, are aliphatic diamines and may be represented as follows:

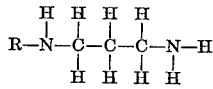

Preferably the alkyl radical R contains from 5 to 20 carbon atoms. "Duomeen C, S and T" are effective in this invention, and are preferred, as are combinations of the same with "Arquad S."

The quaternary salts and other water dispersible salts of said "Duomeens" are effective in the invention. Aliphatic amines may be reacted with alkyl halides to form quaternary salts, as follows:

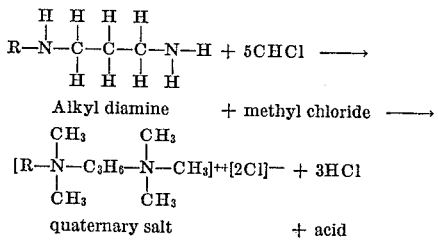

In place of this chloride, any halogen salt, such as bromide, iodide or fluoride is effective in this invention, as are the acetate, sulfate, nitrate and phosphate salts.

As specific examples of alkyl diamines, N-hexyl-N,N-dimethyl-N',N',N'-trimethyl-1,3-diaminopropane, N - octyl - N,N - dimethyl - N',N',N' - trimethyl - 1,3 - diaminopropane and N-dodecyl-N',N',N'-trimethyl-1,3-diaminopropane are effective in this invention, and so is "Duomeen C," which is a mixture of these last three in which the alkyl radical R of the above formula comes from coconut oil, and any or all of their water dispersible salts, such as the hydrochloride, acetate, sulfate, hydrobromide, nitrate and phosphate salts.

T" diacetate is preferred, and is the quaternary diacetate salt of a tallow primary amine, having the formula:

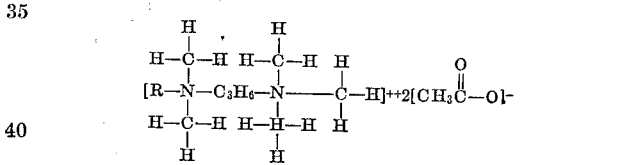

In the preceding formula the alkyl radical "R" comprises in different molecules generally the octadecyl and hexadecyl radicals from tallows.

I have found that 4-chloro-4-nitro-2,6-dimethyl-3,5-heptanediol when present in a concentration of 2.5 parts per million in brine is bacteriostatic and when in concentration of 5 p.p.m. or more in brine is bactericidic in its action toward sulfate reducing bacteria present in the brine. The compound is soluble in isopropyl alcohol. The property can be utilized to disperse it in oil in brine emulsions. The compound is first dissolved in isopropanol at twice the desired concentration. The resulting solution is then diluted with an equal volume of dilution water to prepare an injection fluid for treating brine.

Three compounds are preferred for use in combination with 4-chloro-4-nitro-2,6-dimethyl - 3,5 - heptanediol, because they cause no flocculation nor turbidity in a brine solution. These compounds are Arquad T2C, Deriphat 170C, and Triton X–100.

A stock solution of Produced Water with 1,000 p.p.m. of 4-chloro-4-nitro-2,6-dimethyl-3,5-heptanediol was prepared. Separate stock solutions of 1,000 parts per million of Arquad T2C, Deriphat 170C, and Triton X-100 in Produced Water were made. Mixtures were made of the heptanediol solution and additional Produced Water together with a quantity of the stock solution of the other additives to produce the concentrations indicated. A water/oil emulsion was formed by agitating a small amount of sulfate reducing bacteria culture in Produced Water and crude oil. Glass slides were immersed in this emulsion and placed in jars of the mixtures for 30 minutes, 2 hours and 4½ hours. The results of the runs are given in Table III.

3,415,936

TABLE III.—GROWTH OF SULFATE REDUCING BACTERIA ON GLASS SLIDES IN PRESENCE OF SURFACTANTS AND MIXTURES WITH 4-CHLORO-4-NITRO-2,6-DIMETHYL-3,5-HEPTANEDIOL

| Run | Concentration of additive, p.p.m. | | | | Exposure time of glass slide to additive [1] | | |
|---|---|---|---|---|---|---|---|
| | R-1 | Arquad T2C | Deriphat 170C | Triton X-100 | 30 minutes | 2 hours | 4 hours |
| 1 | 0-50 | | | | +++ | +++ | ++ |
| 2 | | 0-50 | | | +++ | +++ | +++ |
| 3 | | | 0-50 | | +++ | +++ | +++ |
| 4 | | | | 0-50 | +++ | +++ | +++ |
| 5 | 10 | 10 | | | +++ | +++ | +++ |
| 6 | 10 | 50 | | | +++ | +++ | ++ |
| 7 | 50 | 10 | | | +++ | +++ | + |
| 8 | 25 | 25 | | | +++ | +++ | + |
| 9 | 50 | 50 | | | +++ | +++ | --+ |
| 10 | 10 | | 10 | | +++ | +++ | +++ |
| 11 | 10 | | 50 | | +++ | +++ | ++ |
| 12 | 50 | | 10 | | +++ | ++ | ++ |
| 13 | 25 | | 25 | | +++ | --- | --- |
| 14 | 50 | | 50 | | + | --- | --- |
| 15 | 10 | | | 10 | +++ | +++ | +++ |
| 16 | 10 | | | 50 | +++ | +++ | +++ |
| 17 | 50 | | | 10 | +++ | +++ | ++ |
| 18 | 25 | | | 25 | +++ | +++ | + |
| 19 | 50 | | | 50 | +++ | +++ | --- |
| 20 | Control | | | | +++ | +++ | +++ |

[1] Amount of growth of sulfate reducing bacteria after 2 weeks.
+++ Complete darkening of medium.
++ Some darkening of medium.
+ Isolated colony.
--- No growth.

When runs are made with from 2.5 parts of the halonitroalkanol and 97.5 parts of a composition selected from the group consisting of water dispersible and water soluble polyphenols, aliphatic polyphenols, salts of said phenols, and halogenated derivatives of said phenols and salts, alkyl quaternary ammonium salts, aliphatic amines, and salts of aliphatic amines, to 97.5 parts of said halonitroalkanol and 2.5 parts of said second compound, similar synergistic results are obtained.

Reasonable variation and modification are possible within the scope of my invention which sets forth bactericidal compositions, compositions comprising water plus a bactericidal composition, and a method for injecting water into an underground formation.

I claim:

1. A bactericidal composition resistant to the formation of colonies of facultative bacteria, comprising a mixture of approximately equal parts of (a) 4-chloro-4-nitro-2,6-dimethyl-3,5-heptanediol and (b) a mixture of one part tallow trimethyl ammonium chloride and one part dicoconut dimethyl ammonium chloride in a 50 percent solution in propanol.

2. A bactericidal composition resistant to the formation of colonies of facultative bacteria, comprising a mixture of approximately equal parts of 4-chloro-4-nitro-2,6-dimethyl-3,5-heptanediol and N-lauryl-myristyl-β-aminopropionic acid.

3. A bactericidal composition resistant to the formation of colonies of facultative bacteria, comprising a mixture of approximately equal parts of 4-chloro-4-nitro-2,6-dimethyl-3,5-heptanediol and

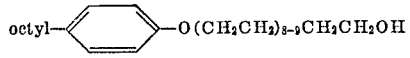

References Cited

UNITED STATES PATENTS 2,839,467  6/1958  Hutchinson et al.  ____ 252—8.55
2,917,428  12/1959  Hitzman  _____ 167—22
3,024,192  3/1962  Bennett et al.  _____ 252—8.55

OTHER REFERENCES

"Deriphats," Chemical Division, General Mills Technical Bulletin 12D, 1959, (pp. 1, 14).

Rohm and Haas Bulletin, C and E News, Apr. 9, 1956, vol. 34, No. 15, pp. 1751 and 1755.

Merck Index, 7th ed., p. 832, Merck and Co., Rahway, N.J., 1960.

"Duomeens, N-alkyl Trimethylene Diamines," Armour Industrial Chemical Company, Chicago, Ill. (pp. 1, 3, 8–10), (copyrighted 1958).

ALBERT T. MEYERS, Primary Examiner.

R. S. DORCAS, Assistant Examiner.

U.S. Cl. X.R.

252—8.55; 424—343, 329, 341

UNITED STATES PATENT OFFICE
CERTIFICATE OF CORRECTION

Patent No. 3,415,936 December 10, 1968

Donald O. Hitzman

It is certified that error appears in the above identified patent and that said Letters Patent are hereby corrected as shown below:

Column 8, lines 28 to 30, the portion of the formula reading "$-O(CH_2CH_2)_{8-9}CH_2CH_2OH$" should read -- $-O(CH_2CH_2O)_{8-9}CH_2CH_2OH$ --.

Signed and sealed this 21st day of April 1970.

(SEAL)
Attest:

Edward M. Fletcher, Jr.           WILLIAM E. SCHUYLER, JR.
Attesting Officer               Commissioner of Patents